United States Patent
Bailey et al.

(10) Patent No.: US 6,687,623 B2
(45) Date of Patent: Feb. 3, 2004

(54) REAL TIME BEARING LOAD SENSING

(75) Inventors: Ted E. Bailey, Ann Arbor, MI (US); John Miller, Jackson, MI (US); Peter M. Eich, Palatine, IL (US)

(73) Assignee: NTN Corporation, Osaka (JP)

(*) Notice: Subject to any disclaimer, the term of this patent is extended or adjusted under 35 U.S.C. 154(b) by 290 days.

(21) Appl. No.: 09/860,150

(22) Filed: May 17, 2001

(65) Prior Publication Data

US 2002/0057856 A1 May 16, 2002

Related U.S. Application Data (60) Provisional application No. 60/205,017, filed on May 17, 2000.

(51) Int. Cl.[7] .................................................. G01L 1/00
(52) U.S. Cl. .................................... 702/42; 73/862.541
(58) Field of Search ..................... 73/862.541, 862.55, 73/862.635, 862.49, 862.628; 702/42

(56) References Cited

U.S. PATENT DOCUMENTS 4,203,319 A * 5/1980 Lechler .................. 73/862.541
5,952,587 A * 9/1999 Rhodes et al. .......... 73/862.541

FOREIGN PATENT DOCUMENTS

WO    WO 01/23862 A1    4/2001

OTHER PUBLICATIONS

Y. Hayashi et al., "Analysis of Fluctuations in Bearing Preload and Optimal Design of Tapered Roller Bearings for Pinion Shaft Support in Differential Gearboxes", SAE Technical Paper Series 2001–01–0884, SAE 2001 World Congress, Mar. 5–8, 2001, pp. 1–8.

* cited by examiner

Primary Examiner—John Barlow
Assistant Examiner—Stephen J. Cherry
(74) Attorney, Agent, or Firm—Brinks Hofer Gilson & Lione (57) ABSTRACT

A method for determining real time load values experienced by a bearing includes providing a bearing with an inner race, an outer race, and a plurality of rolling elements disposed therebetween. Mounting a plurality of strain gages to the bearing, and collecting data of the strains measured under a plurality of known load conditions. Correlating the strains measured at each strain gage position to the load at that position for each of the plurality of load conditions to develop a first equation for each strain gage position defining the load as a function of the strain measured. Mounting the bearing to a machine, using the machine under loaded conditions, and collecting the strain gage data produced. Using the equations for each strain gage position to convert the strain measured into a load. Summing the loads experienced by the bearing to determine the total load being experienced by the bearing.

21 Claims, 4 Drawing Sheets

REAL TIME BEARING LOAD SENSING

CROSS REFERENCE TO RELATED APPLICATIONS

This application claims the benefit of related provisional application serial No. 60/205,017 filed May 17, 2000.

TECHNICAL FIELD OF THE INVENTION

The present invention generally relates to a rolling element bearing assembly and particularly to one that includes sensors which provide an output indicating loads applied to the bearing.

BACKGROUND

Often in the development of mechanical systems there is a need to evaluate loads applied to a bearing assembly. These load values will enable an appropriate selection of bearing components for a particular application. While systems exist for measuring loads on bearings, they are often complex systems which do not reliably provide a load output. A particular deficiency in many existing approaches is a lack of real time load outputs. Instead an integrated load value can be surmised from an inspection of the components following a cyclical load application.

Accordingly, there is a need in the art to provide a rolling element bearing assembly which provides the capability for providing a load output measurement in real time for use in bearing evaluation, development and component selection.

SUMMARY OF THE INVENTION

In accordance with an aspect of the present invention, a rolling element bearing assembly includes an inner race, an outer race and a plurality of rolling elements disposed between and interconnecting the outer race and the inner race. The assembly further includes a plurality of strain gages mounted to the bearing assembly, and a device to receive output from the strain measuring devices and to transform the output into real time load data.

This invention further provides a method for determining real time load values experienced by a rolling element bearing. A plurality of strain gages are mounted to the bearing in a particular orientation, enabling the collection of strain data measured under a plurality of known load conditions. By correlating the strains measured at each strain gage position to the load at that position for each of a plurality of load conditions, equations can be derived for each strain gage position defining the load as a function of the strain measured. Summing the loads experienced by the bearing as measured by the strain gages enables a determination of the total load being experienced by the bearing.

DETAILED DESCRIPTION OF THE PREFERRED EMBODIMENT

The following description of the preferred embodiment of the invention is not intended to limit the scope of the invention to this preferred embodiment, but rather to enable any person skilled in the art to make and use the invention.

Referring to FIGS. 1 through 5, a rolling element bearing assembly of the present invention is generally shown at 10. The bearing assembly includes an inner race 12 having a central axis 14 and an outer race 16, mounted to the inner race 12 and adapted to support a load. The bearing assembly 10 further includes a plurality of rolling elements 18 disposed between and interconnecting the outer race 16 and the inner race 12 to support the outer race 16 on the inner race 12 and to allow the outer race 16 to rotate with respect to the inner race 12 about the central axis 14. A plurality of strain gages 20 are mounted to the bearing assembly 10 and are attached to a device that receives outputs from the strain gages 20 and transforms the output into real time load data. The strain gages 20 are preferably resistance type, which are adhesively mounted to the bearing 10 surface. Strain is measured as a resistance change in the strain gage 20.

Figure 2:
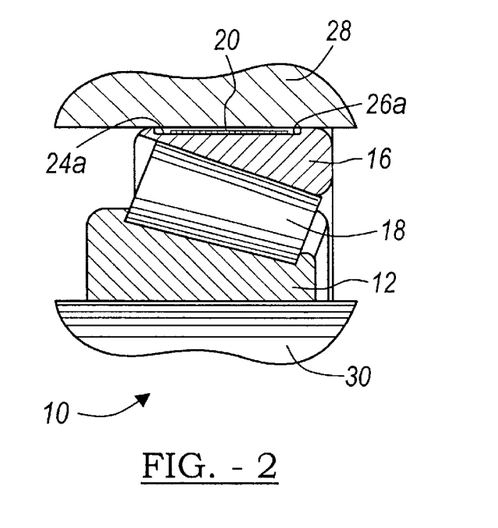
FIG. 2 is a side section view of a bearing of the present invention with a channel formed within the outer race.
Figure 3:
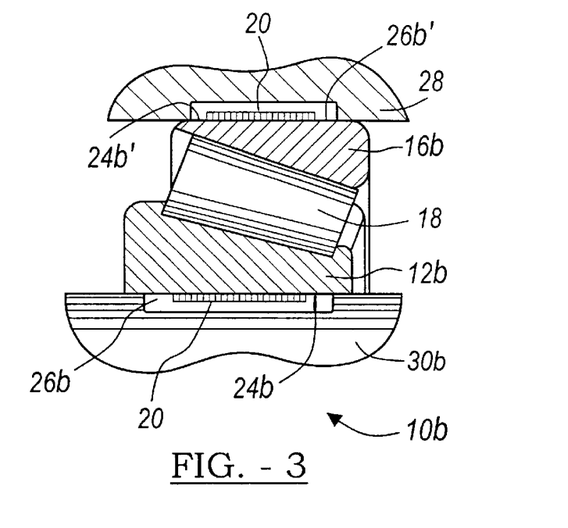
FIG. 3 is a side sectional view of a bearing of the present invention with a channel formed in the support to which the bearing is mounted.

In the preferred embodiment, the bearing assembly 10 includes an unsupported surface 24 in one or both of the races 12, 16. The unsupported surface 24 is a cylindrical inner or outer surface extending annularly around the inner diameter of the inner race 12 or the outer diameter of the outer race 16. The unsupported surface 24 can be formed in a plurality of ways. Referring to FIG. 2, the outer race 16 can include a channel 26a formed therein which extends annularly about the outer race 16. When a bearing carrier 28 is placed to the outer diameter of the bearing assembly 10, there will be a gap between the bottom of the channel and the bearing carrier 28 that is mounted to the bearing, thereby making the bottom of the channel unsupported. When a load is placed to the bearing, the bottom of the channel, or the unsupported surface 24a is allowed to flex or bend outward within the gap. The channel extends annularly around the bearing assembly 10 to allow bending deflection on the unsupported surface 24. Referring to FIG. 3, the axle 30b to which the bearing assembly 10b is mounted can include a channel 26b extending annularly around the axle 30b, thereby leaving a cylindrical portion of the inner race 12b unsupported by the axle 30b to provide an unsupported surface 24b.

Figure 4:
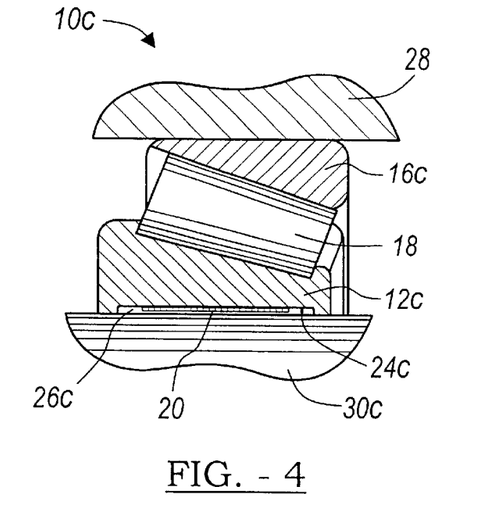
FIG. 4 is a side sectional view of a bearing of the present invention with a channel formed within the inner race.
Figure 5:
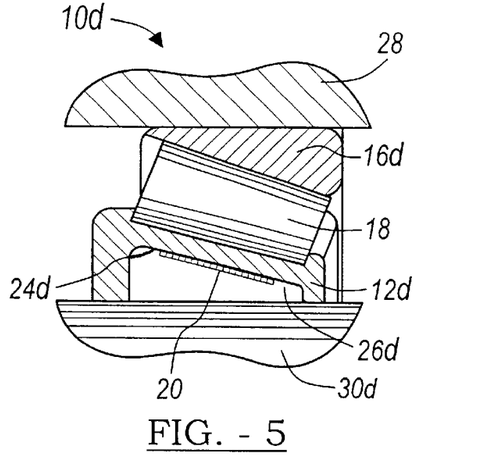
FIG. 5 is a side sectional view of a bearing of the present invention with a deep channel formed within the inner race.
Figure 6:
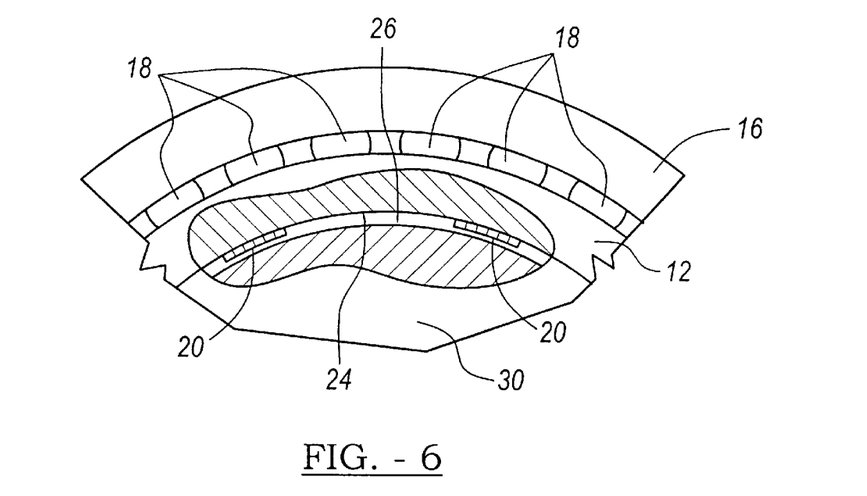
FIG. 6 is an partial end sectional view of a bearing of the present invention with a channel formed within the axle.

Additionally, a channel 26b' can be formed within the bearing retainer 28 which is mounted to the outer race 16b to leave a cylindrical portion of the outer race 16b unsupported, thereby presenting the unsupported surface 24b'. Referring to FIG. 4, the inner race 12c can include a channel 26c extending annularly around the inner race 12c, thereby providing an inner cylindrical surface 24c. When a load is placed upon the bearing assembly 10c, the surface 24c is allowed to bend within the gap formed between the unsupported surface 24c and the axle 30c. Referring to FIG. 5, a bearing assembly 10d is shown wherein the channel 26d formed within the inner race 12d is cut deep into the inner race 12d to form the unsupported surface 24d. This may be desirable in order to decrease the stiffness of the bearing assembly 10d so the bearing assembly 10d will exhibit greater deflection, thus improving sensitivity to applied loads.

An unsupported surface 24 within the bearing assembly 10 is necessary to provide a point on the bearing assembly 10 where deflection of the bearing will occur. Preferably, the strains measured are due to bending or flexing of the bearing along the unsupported surface of the bearing assembly 10. The strain gages 20 are preferably mounted to the bearing assembly 10 on the unsupported surface 24 to maximize the readings of the strain gages 20. Additionally, the strain gages 20 can be mounted to the bearing assembly 10 in any orientation, but in the preferred embodiment, the strain gages 20 are axially aligned with the central axis 14 of the bearing assembly 10 in order to measure bending strains in the axial direction. An applied load on the bearing 10 having a radial component causes bending deflection on the unsupported surface 24. The bending deflection is measured as tensile strain in the unsupported surface 24, aligned axially, or parallel to the axis of the bearing 14.

A first preferred method for determining real time load values experienced by a bearing includes providing a bearing assembly 10 as described above, and mounting a plurality of strain gages 20 to the bearing assembly 10 at the bearing rolling element 18 positions. Preferably at least two strain gages 20 are used, wherein a strain gage 20 is located at the point of direct radial loading, and a strain gage 20 is indexed rotationally from the first strain gage 20.

In operation, the bearing assembly 10 can be mounted where the axle 30 to which the inner race 12 is mounted, is rotationally stationary and the load placed to the bearing assembly 10 is directed through the axle 30. In this case, the direction of loading does not change with respect to the bearing assembly 10, and therefore, the strain gages 20 will be mounted to the inner race 12 with one of the gages 20 being aligned with the point of direct radial load.

An alternative situation is where the load is directed through a point on the outer race 16. In this situation, the point of direct load moves about the bearing assembly 10 as the outer race 16 rotates about the inner race 12, and therefore, the strain gages 20 will be mounted to the outer race 16 with one of the gages 20 being aligned with the point on the outer race 16 where the maximum bending deflection occurs. Each of these two situations illustrates the concept that the strain gages 20 are aligned with the point of maximum bending deflection caused by the radial loading. If the loading is rotatably stationary with respect to the inner race 12 of the bearing assembly 10, then the strain gages 20 are mounted to the inner race 12, and if the point of direct loading rotates about the bearing assembly 10, then the strain gages 20 will be mounted to the outer race 16.

Data are then collected from the strain gages 20 by simulating known load conditions on the bearing assembly 10 and recording the strains experienced under the load conditions. Preferably, data are collected under a plurality of known load conditions. Multiple load conditions will provide multiple data points which will ultimately provide more accurate load information when the bearing assembly 10 is used in the field.

Data can be collected under known load conditions in one of two ways. Preferably, the bearing assembly 10 is placed onto a test fixture and cycled under different load conditions. As the bearing assembly 10 is cycled, the data from the strain gages 20 mounted thereon are recorded. However, for applications in which the bearing assembly 10 is extremely large, it is not practical or possible to place the bearing assembly 10 onto a test fixture. Alternatively, a finite element model of the bearing assembly 10 can be created and data of the expected strains under know load conditions can be determined through finite element analysis.

Once data from each of the strain gages 20 have been compiled under each of the different known load conditions, the strains measured are correlated to the loads to develop a set of equations defining the axial, or thrust loads, designated as "A", and the radial loads, designated as "R", on the bearing assembly 10 as a function of the strains measured on the bearing assembly 10. In the preferred embodiment, the different loads are defined in terms of the ratio of the radial load, (R), to the axial, or thrust load, (A). A strain gage ratio is calculated for each combination of load ratios and loads. The strain gage ratio is the ratio of the strain gage 20 at the point of highest loading to the other strain gage 20. If more than two strain gages 20 are used, then a more complex relationship of the strain gages 20 is necessary. Next, the strain gage ratios for each different load condition are averaged. A regression analysis is then performed on the data to derive a first equation, which is an equation that defines the ratio of the loads as a function of the relationship of the strain gages 20.

Next, a regression analysis is performed on the sum of the radial (R) and axial (A) loads to derive a second equation defining the sum of the radial and axial loads as a function of the strain on the highest loaded strain gage 20. Preferably, the second equation is linear and has a unique slope for each of the different load ratios. A third equation is calculated by completing a regression analysis to derive an equation that defines the slope of the second equation as a function of the load ratios. Now, the second and third equation are combined to form an equation which defines the sum of the radial and axial loads and a function of the strain measured on the highest loaded strain gage 20 and the ratio of the radial to axial loads.

Now, the actual strain gage readings from the strain gages 20 under unknown load conditions are plugged into the first equation to solve for the ratio of radial to axial loads. Then the ratio of radial to axial loads is plugged into the fourth equation to solve for the sum of radial and axial loads. Finally, the axial radial loads can be calculated by plugging the ratio of radial to axial loads and the sum of the radial and axial loads into the following equations, where A is the axial or thrust load, and R is the radial load.

$$A=(R+A)/[(R/A)+1]$$

$$R=(R+A)-[(R+A)/[(R/A)^2]]$$

The first preferred method of determining real time load values that are experienced by a bearing assembly 10 works well if the system, meaning the bearing assembly 10, and the axle 30 to which the bearing assembly 10 is being mounted to, are fairly rigid. This is because the method and the equations developed by the first preferred method are basic in nature, and do not take into consideration the effects of dramatic flexing of the axle shaft 30 and/or the bearing assembly 10. Therefore, in a system where flexing of the axle shaft 30 and other components is an issue, a different approach is used to relate the strains measured on the bearing assembly 10 to the loads experienced by the bearing assembly 10.

Preferably, a device (not shown) is used to receive the data produced by the strain gages 20 instantaneously perform the calculations and conversions, and to provide real time output of the radial and axial loads on the bearing assembly 10. Preferably, the device is a computer, however it is to be understood, that the data could be read and analyzed using any suitable method including reading the strain gage data and doing the calculations manually.

Figure 8:
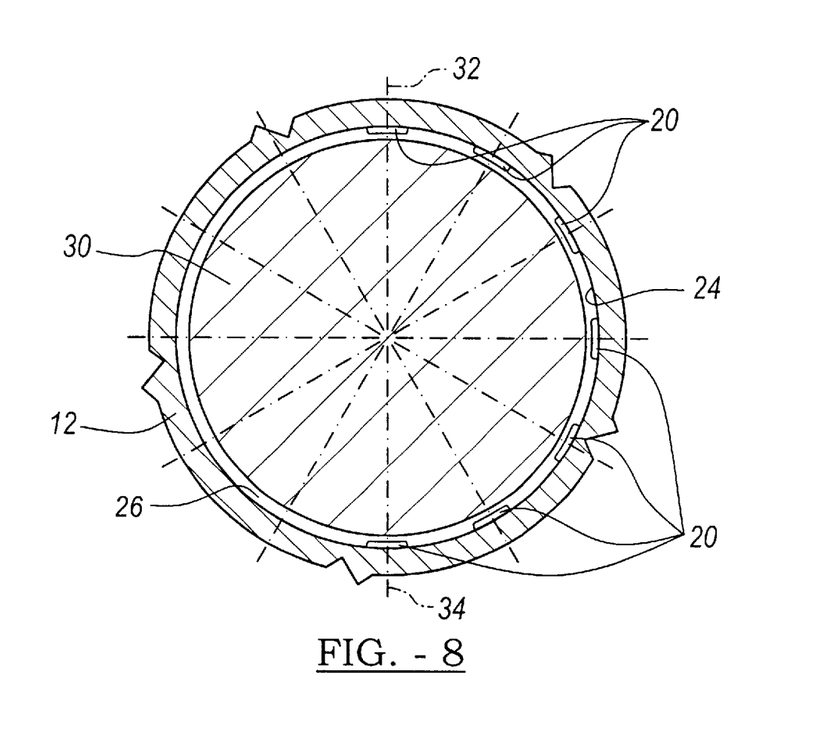
FIG. 8 is a partial end sectional view showing a bearing assembly with seven strain gages.

A second preferred method for determining real time load values experienced by a bearing includes providing a bearing assembly 10 as described above, and mounting a plurality of strain gages 20 to the bearing assembly 10 at the bearing rolling element 18 positions. Ideally, a strain gage 20 mounted to the bearing assembly 10 at each rolling element position would provide the most accurate data. However, for practical purposes it is preferred to stager a plurality of strain gages 20 around the bearing assembly 10. Referring to FIG. 8, due to the symmetry of the bearing assembly 10, only seven strain gages 10 are placed to the bearing assembly 10 starting at the zero degree position 32, and staggered every thirty degrees about one side of the bearing assembly 10, with the seventh strain gage 20 being mounted at the one hundred and eighty degree position 34. For an asymmetrical structure, it would be necessary to place strain gages 20 around the entire circumference of the bearing assembly 10. It is to be understood, that the invention could be practiced with any suitable number of rolling elements 18 within the bearing assembly 10 and an appropriate number of strain gages 20 spaced symmetrically about the bearing assembly 10.

The strain gages 20 are preferably mounted to an unsupported surface 24, as discussed above. Additionally, the strain gages 20 can be mounted to the bearing assembly 10 in any orientation, but in the preferred embodiment, the strain gages 20 are axially aligned with the central axis 14 of the bearing assembly 10 to measure tensile strain in the axial direction of the bearing.

Data are then collected from the strain gages 20 by simulating known load conditions on the bearing assembly 10 and recording the strains experienced under the load conditions. Preferably, data are collected under a plurality of known load conditions. Multiple load conditions will provide multiple data points which will ultimately provide more accurate load information when the bearing assembly 10 is used in the field.

Data can be collected under known load conditions in one of two ways. Preferably, the bearing assembly 10 is placed onto a test fixture and cycled under different load conditions. As the bearing assembly 10 is cycled, the data from the strain gages 20 mounted thereon is recorded. However, for applications in which the bearing assembly 10 is extremely large, it is not practical or possible to place the bearing assembly 10 onto a test fixture. Alternatively, a finite element model of the bearing assembly 10 and the axle can be created and data of the expected strains under known load conditions can be determined through finite element analysis.

Once data from each strain gage 20 have been compiled under each of the different known load conditions, the strains measured are correlated to the loads to develop a set of equations defining the axial and radial loads on the bearing assembly 10 as a function of the strains measured on the bearing assembly 10. In the preferred embodiment a regression analysis is done on the strain data for each of the different load conditions at each of the strain gage locations individually to develop a load equation defining the load at each strain gage position as a function of the strain measured at that position. It is to be understood, that any suitable type of regression analysis can be used. Depending on the data, a linear regression may be the most accurate, or a second or third order regression may be more accurate. The type of regression that best fits the data is appropriate.

After the load equations relating the loads at each strain gage position to the strains measured at the corresponding position are developed, the strain data from the known loads can be plugged into the load equations to get calculated load values. Any error between the calculated load values, and the known load values can be analyzed with a regression technique to develop a first error equation relating the error between the calculated load and the actual load to the strain at each strain gage position. A first error equation is calculated for each of the strain gage positions, and either added to or subtracted from the load equation at the appropriate strain gage location. The resulting equation will have less error and give more accurate load data. This procedure, of developing an error equation can be repeated as many times as desired to result in a more accurate load equation each time an error equation adjustment is made.

Next, the bearing assembly 10 is mounted to an axle 30 of some machine or vehicle and used under a plurality of normal loaded conditions. As the machine is used, the strain gages are producing strain data. The data are collected and plugged into the load equations developed at each strain gage position to calculate the loads at the strain gage positions. Preferably, the data are fed from the strain gages to a device that will instantaneously perform the calculations and conversions, and provide real time output of the loads on the bearing assembly 10. After the loads are calculated for the strain gage positions, the loads for the rolling element positions between the strain gage positions are calculated by extrapolation, resulting in a calculated load at each rolling element position on the bearing assembly 10. Once the loads at the individual rolling element positions have been calculated, the loads are summed, resulting in the total load that the bearing assembly 10 is experiencing.

The bearing assembly 10 can be of any type of bearing, such as a cylindrical rolling element bearing or needle bearing that are designed to handle only radial loads, but in most applications, a tapered rolling element bearing, ball bearing or some other type of bearing that are designed to support axial and radial loads is required. If the bearing assembly 10 is the type of bearing that can accommodate both radial and axial loads, then after all the loads have been calculated at each of the rolling element positions, the load is resolved into the radial and axial components. This is done with simple calculations based upon the geometry of the ball bearing or tapered rolling element bearing. After that, the axial components are summed, and the radial components are summed, resulting in the total axial load and the total radial load being experienced by the bearing assembly 10.

EXAMPLES

The following examples are included to demonstrate preferred embodiments and methods in accordance with the present invention. It should be appreciated by those skilled in the art that the techniques disclosed in the examples that follow represent embodiments and methods envisioned by the inventors to function well in the practice of the invention, and thus can be considered to constitute preferred modes for its practice. As such, the Examples are not to be construed to limit the invention to the preferred modes. Furthermore, those skilled in the art should appreciate that many changes can be made in the specific embodiments and methods that are disclosed and still obtain like or similar results without departing from the spirit and scope of the invention.

Example #1

Figure 1:
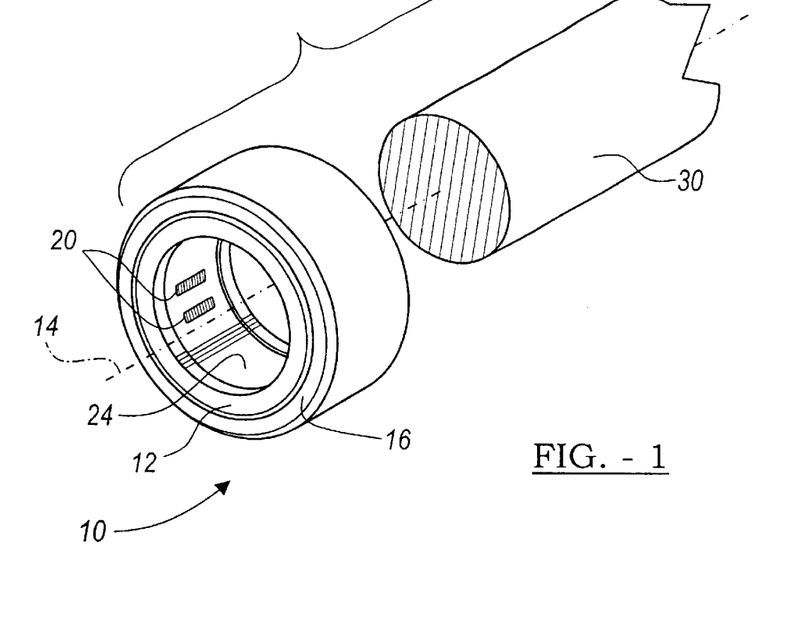
FIG. 1 is a perspective view of a bearing assembly of the present invention.
Figure 9:
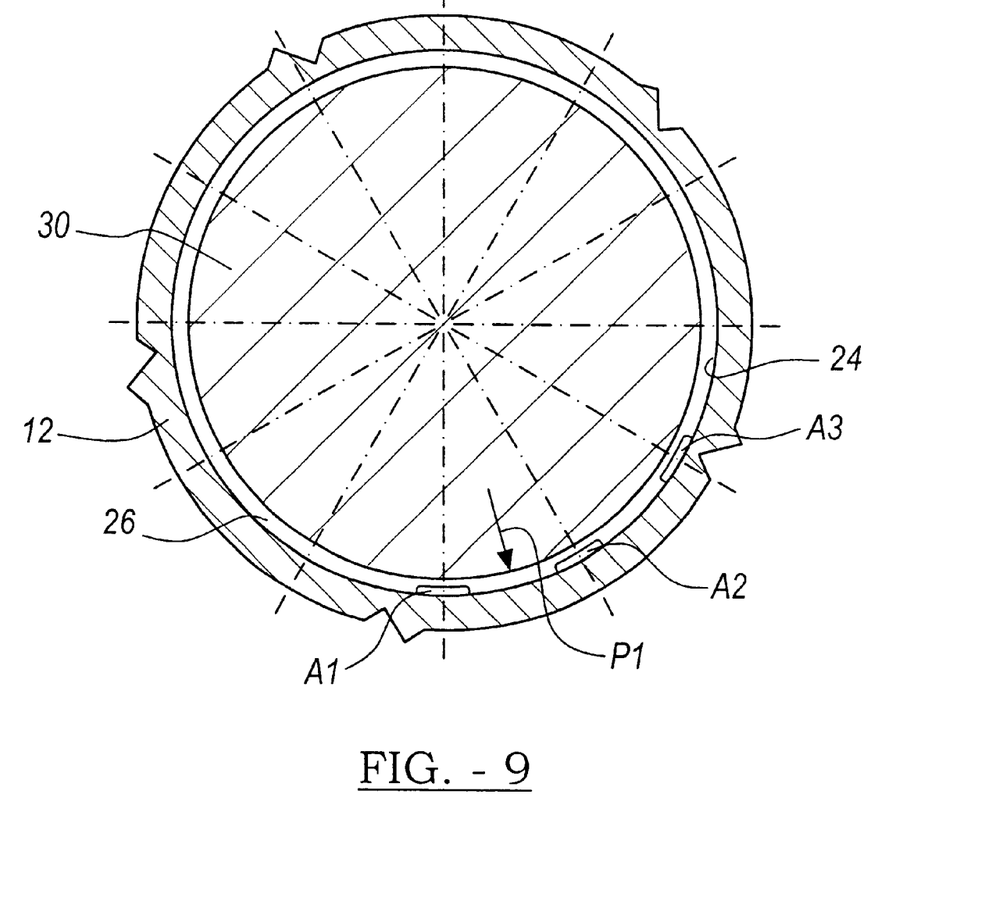
FIG. 9 is a partial end sectional view showing a bearing assembly with three strain gages.

Referring to FIGS. 1 and 5, the bearing assembly 10 used in Example #1 is a tapered rolling element bearing with 33 rolling elements 18. Referring to FIG. 9, three strain gages A1, A2, and A3 were placed to the inner diameter of the inner race. The bearing bores have been relieved to allow for unsupported flexure of the inner race 12. All three of the strain gages were aligned axially with the bearing assembly 10. A load was applied to the bearing at P1, and was stationary with respect to the inner race, thereby maintaining position with respect to the strain gages 20. The point P1 falls between the strain gages A1 and A2, therefore, the strains measured at those two gages were averaged to get A12, therefore allowing the experiment to be conducted as if there were two strain gages A12 and A3. Sixteen tests were run with four different load ratios and four different load combinations for each load ratio. The data collected from these tests is summarized in Table 1 below, where R/A is the ratio of Radial load to Axial load.

TABLE 1

| | Known Bearing Loads (lbs.) | | Measured Strain ($\mu$in./in.) | |
|---|---|---|---|---|
| R/A | Radial | Axial | $\epsilon_{12}$ | $\epsilon_3$ |
| 5 | 17,504 | 3,500 | 306 | 217 |
| 5 | 19,998 | 4,000 | 353 | 244 |
| 5 | 22,492 | 4,500 | 394 | 266 |
| 5 | 24,986 | 5,000 | 422 | 282 |
| 4 | 9,590 | 2,400 | 177 | 134 |
| 4 | 11,598 | 2,900 | 214 | 160 |
| 4 | 13,606 | 3,400 | 256 | 187 |
| 4 | 15,614 | 3,900 | 304 | 223 |
| 3 | 5,159 | 1,720 | 126 | 109 |
| 3 | 5,758 | 1,920 | 145 | 123 |
| 3 | 6,357 | 2,120 | 163 | 138 |
| 3 | 6,966 | 2,320 | 176 | 146 |
| 2 | 2,104 | 1,050 | 72 | 84 |
| 2 | 2,499 | 1,250 | 87 | 98 |
| 2 | 2,894 | 1,450 | 113 | 120 |
| 2 | 3,299 | 1,650 | 125 | 131 |

Next, the strain gage ratios for all sixteen tests were calculated and the average strain gage ratio for each of the four radial to axial load ratios was calculated. The results are summarized in Table #2 below.

TABLE 2

| R/A | $\epsilon_{12}$ ($\mu$in./in.) | $\epsilon_3$ ($\mu$in./in.) | $\epsilon_{12}/\epsilon_3$ | Average |
|---|---|---|---|---|
| 5 | 306 | 217 | 1.41 | 1.438 |
| 5 | 353 | 244 | 1.45 | |
| 5 | 394 | 266 | 1.48 | |
| 5 | 422 | 282 | 1.5 | |
| 4 | 177 | 134 | 1.32 | 1.3521 |
| 4 | 214 | 160 | 1.34 | |
| 4 | 256 | 187 | 1.37 | |
| 4 | 304 | 223 | 1.36 | |
| 3 | 126 | 109 | 1.16 | 1.1894 |
| 3 | 145 | 123 | 1.18 | |

TABLE 2-continued

| R/A | $\epsilon_{12}$ ($\mu$in./in.) | $\epsilon_3$ ($\mu$in./in.) | $\epsilon_{12}/\epsilon_3$ | Average |
|---|---|---|---|---|
| 3 | 163 | 138 | 1.18 | |
| 3 | 176 | 146 | 1.2 | |
| 2 | 72 | 84 | 0.86 | 0.9123 |
| 2 | 87 | 98 | 0.89 | |
| 2 | 113 | 120 | 0.94 | |
| 2 | 125 | 131 | 0.95 | |

Now a second order regression analysis was done on the data to derive an equation that defines the ratio of the loads to the ratio of the strains measured.

$$R/A = 4.2242 - 6.5016(\epsilon_{12}/\epsilon_3) + 4.6636(\epsilon_{12}/\epsilon_3)^2 \quad \text{First Equation}$$

Next a linear regression analysis of the sums of the radial and axial loads was done to derive and equation for the sum of the radial and axial loads as a function of the strain on at the point of loading, or $\epsilon_{12}$, where m is the slope of the linear equation, R is the radial load, and A is the axial load.

$$(R+A) = m(\epsilon_{12}) + 1000 \quad \text{Second Equation}$$

The second equation will have a different slope, m, for each load ratio. The slope, m, has values 33, 48, 61 and 64 for the load ratios 2, 3, 4 and 5 respectively. Now, a linear regression analysis of the slopes was done to derive an equation defining the slopes as a function of the load ratios.

$$m = -18.6 + 31.6(R/A) - 3(R/A)^2 \quad \text{Third Equation}$$

By combining Equations Two and Three, a fourth equation defining the sum of the radial and axial loads as a function of the strain at the point of loading and the ratio of the radial to axial loads is derived.

$$(R+A) = 1000 + \epsilon_{12}[-18.6 + 31.6(R/A) - 3(R/A)^2] \quad \text{Fourth Equation}$$

Now, there are two equations and two unknowns. To solve the equations, the strain gage values, $\epsilon 12$ and $\epsilon 3$ are plugged into the First Equation to solve for (R/A). Then, (R/A) and $\epsilon 12$ are plugged into the fourth equation to solve for (R+A). Finally, the radial load, R, and the axial load, A, can be calculated by using (R+A) and (R/A) as shown below.

$$A = (R+A)/[(R/A)+1] \quad \text{Fifth Equation}$$

$$R = (R+A) - [(R+A)/(R/A)^2] \quad \text{Sixth Equation}$$

By running the bearing through the same load conditions, collecting the strain data, and using the technique described above, the calculated values of the loads were within a few percent of the actual loads as summarized in Table 3 below, where radial load, R, and axial load A are given in pounds, and all strains are given in microinches/inch.

TABLE 3

| ACTUAL | | | | MEASURED | | | | CALCULATED | | | |
|---|---|---|---|---|---|---|---|---|---|---|---|
| R | A | R/A | R + A | $\epsilon_{12}$ | $\epsilon_3$ | $\epsilon_{12}/\epsilon_3$ | Total | R/A | R + A | R | A |
| 17504 | 3500 | 5 | 21004 | 311.6 | 216.7 | 1.44 | 528.3 | 4.518 | 20610 | 16875 | 3735 |
| 19998 | 4000 | 5 | 23998 | 363 | 244.2 | 1.49 | 607.2 | 4.865 | 24279 | 20139 | 4140 |
| 22492 | 4500 | 5 | 26992 | 408.7 | 266.4 | 1.53 | 675.1 | 5.226 | 27405 | 23004 | 4402 |
| 24986 | 5000 | 5 | 29986 | 441.2 | 281.9 | 1.57 | 723.1 | 5.472 | 29452 | 24901 | 4550 |
| 9590 | 2400 | 4 | 11990 | 178.7 | 134.2 | 1.33 | 312.9 | 3.836 | 11449 | 9082 | 2367 |
| 11598 | 2900 | 4 | 14498 | 216.5 | 159.6 | 1.36 | 376.1 | 3.986 | 13924 | 11132 | 2792 |
| 13606 | 3400 | 4 | 17006 | 259.6 | 186.8 | 1.39 | 446.4 | 4.196 | 16880 | 13631 | 3249 |

TABLE 3-continued

| ACTUAL | | | | MEASURED | | | | CALCULATED | | | |
|---|---|---|---|---|---|---|---|---|---|---|---|
| R | A | R/A | R + A | $\epsilon_{12}$ | $\epsilon_3$ | $\epsilon_{12}/\epsilon_3$ | Total | R/A | R + A | R | A |
| 15614 | 3900 | 4 | 19514 | 307.2 | 222.9 | 1.38 | 530.1 | 4.122 | 19641 | 15807 | 3835 |
| 5159 | 1720 | 3 | 6879 | 122.2 | 109.4 | 1.12 | 231.6 | 2.781 | 6630 | 4876 | 1754 |
| 5758 | 1920 | 3 | 7678 | 141.5 | 123.2 | 1.15 | 264.7 | 2.909 | 7783 | 5792 | 1991 |
| 6357 | 2120 | 3 | 8477 | 160.8 | 135.7 | 1.18 | 296.5 | 3.068 | 9059 | 6832 | 2227 |
| 6966 | 2320 | 3 | 9286 | 171.2 | 146.1 | 1.17 | 317.3 | 3.009 | 9445 | 7089 | 2356 |
| 2104 | 1050 | 2 | 3154 | 63.4 | 84 | 0.75 | 147.4 | 1.974 | 3034 | 2014 | 1020 |
| 2499 | 1250 | 2 | 3749 | 77.7 | 98.2 | 0.79 | 175.9 | 2.0 | 3532 | 2355 | 1178 |
| 2894 | 1450 | 2 | 4344 | 101.2 | 120 | 0.84 | 221.2 | 2.058 | 4413 | 2970 | 1443 |
| 3299 | 1650 | 2 | 4949 | 113.5 | 131.9 | 0.86 | 254.4 | 2.083 | 4882 | 3298 | 1584 |

Example #2

Figure 7:
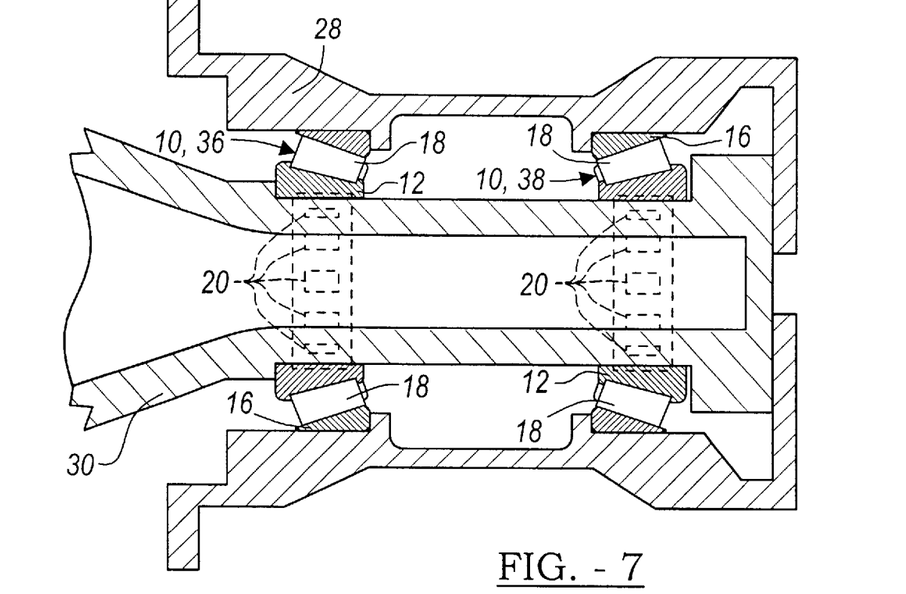
FIG. 7 is a side sectional view of a an axle shaft with two bearing assemblies mounted thereon.

Referring to FIGS. 7 and 8, the analysis was done for a dual bearing arrangement designed for a very large vehicle carrying very large loads on the order of 1,000,000 pounds and being used under significant grades. Due to the size of the application, it was not practical to do laboratory testing. Instead, a finite element analysis model of an axle was created. Using four load scenarios and FEA analysis, data for the strains on the bearings 10 were simulated under four known load conditions. The bearing assemblies 10 are both tapered rolling element bearing with 36 rolling elements each. They are oriented axially opposite each other at a distance from each other on the axle shaft 30. The bearing bores have been relieved to allow for unsupported flexure of the inner race 12. The two bearing assemblies 10 are labeled as the inboard bearing 36 and the outboard bearing 38. The load scenarios are summarized in Table 4 below.

TABLE 4

| Axle Load (radial) (pounds) | Position | Slope | Side Load (axial) (pounds) |
|---|---|---|---|
| 121,000 | Inboard | 0 degrees | 0 |
| 121,000 | Outboard | 0 degrees | 0 |
| 398,000 | Inboard | 0 degrees | 39,800 |
| 398,000 | Outboard | 0 degrees | 39,800 |
| 449,000 | Inboard | 8 degrees | 0 |
| 449,000 | Outboard | 8 degrees | 0 |
| 676,000 | Inboard | 0 degrees | 406,000 |
| 676,000 | Outboard | 0 degrees | 406,000 |

Seven virtual strain gages were placed on each of the two bearing assemblies 10 within the FEA model. The first virtual strain gage was placed at the 12:00 position, or zero degrees 32 and one placed every thirty degrees thereafter, so that a virtual strain gage was located at the 0°, 30°, 60°, 90°, 120°, 150° and 180° positions on each bearing assembly 10. The virtual strain gages 20 were placed to the inner diameter of the inner race 12 and were aligned axially with the bearing assemblies 10. The simulated strain data that was collected for each of the strain gages 20 under each of the load conditions is summarized in Tables 5, 6, 7 & 8 below.

TABLE 5

AXIAL STRAIN
Wheel Load: 121,000 lbs. Side Load: 0 lbs.

| Rolling element Position | Inboard Strain ($\mu$in./in.) | Outboard Strain ($\mu$in./in.) |
|---|---|---|
| 0° | $\epsilon_0 = 183$ | $\epsilon_0 = 165$ |
| 30° | $\epsilon_{30} = 168$ | $\epsilon_{30} = 156$ |
| 60° | $\epsilon_{60} = 129$ | $\epsilon_{60} = 131$ |
| 90° | $\epsilon_{90} = 89$ | $\epsilon_{90} = 99$ |

TABLE 5-continued

AXIAL STRAIN
Wheel Load: 121,000 lbs. Side Load: 0 lbs.

| Rolling element Position | Inboard Strain ($\mu$in./in.) | Outboard Strain ($\mu$in./in.) |
|---|---|---|
| 120° | $\epsilon_{120} = -13$ | $\epsilon_{120} = -14$ |
| 150° | $\epsilon_{150} = 3$ | $\epsilon_{150} = 14$ |
| 180° | $\epsilon_{180} = 55$ | $\epsilon_{180} = 62$ |

TABLE 6

AXIAL STRAIN
Wheel Load: 398,000 lbs. Side Load: 39,800 lbs.

| Rolling element Position | Inboard Strain ($\mu$in./in.) | Outboard Strain ($\mu$in./in.) |
|---|---|---|
| 0° | $\epsilon_0 = 749$ | $\epsilon_0 = 309$ |
| 30° | $\epsilon_{30} = 672$ | $\epsilon_{30} = 294$ |
| 60° | $\epsilon_{60} = 406$ | $\epsilon_{60} = 249$ |
| 90° | $\epsilon_{90} = 65$ | $\epsilon_{90} = 177$ |
| 120° | $\epsilon_{120} = 5$ | $\epsilon_{120} = -10$ |
| 150° | $\epsilon_{150} = -12$ | $\epsilon_{150} = 19$ |
| 180° | $\epsilon_{180} = -14$ | $\epsilon_{180} = 43$ |

TABLE 7

AXIAL STRAIN
Wheel Load: 448,000 lbs. Side Load: 0 lbs.

| Rolling element Position | Inboard Strain ($\mu$in./in.) | Outboard Strain ($\mu$in./in.) |
|---|---|---|
| 0° | $\epsilon_0 = 621$ | $\epsilon_0 = 544$ |
| 30° | $\epsilon_{30} = 567$ | $\epsilon_{30} = 496$ |
| 60° | $\epsilon_{60} = 414$ | $\epsilon_{60} = 373$ |
| 90° | $\epsilon_{90} = 182$ | $\epsilon_{90} = 159$ |
| 120° | $\epsilon_{120} = -4$ | $\epsilon_{120} = -1$ |
| 150° | $\epsilon_{150} = 5$ | $\epsilon_{150} = 4$ |
| 180° | $\epsilon_{180} = 9$ | $\epsilon_{180} = 7$ |

TABLE 8

AXIAL STRAIN
Wheel Load: 676,000 lbs. Side Load: 406,000 lbs.

| Rolling element Position | Inboard Strain ($\mu$in./in.) | Outboard Strain ($\mu$in./in.) |
|---|---|---|
| 0° | $\epsilon_0 = 3477$ | $\epsilon_0 = -42$ |
| 30° | $\epsilon_{30} = 3236$ | $\epsilon_{30} = -34$ |

TABLE 8-continued

AXIAL STRAIN
Wheel Load: 676,000 lbs. Side Load: 406,000 lbs.

| Rolling element Position | Inboard Strain ($\mu$in./in.) | Outboard Strain ($\mu$in./in.) |
|---|---|---|
| 60° | $\epsilon_{60}$ = 2588 | $\epsilon_{60}$ = 10 |
| 90° | $\epsilon_{90}$ = 1717 | $\epsilon_{90}$ = 107 |
| 120° | $\epsilon_{120}$ = 951 | $\epsilon_{120}$ = 585 |
| 150° | $\epsilon_{150}$ = 142 | $\epsilon_{150}$ = 1134 |
| 180° | $\epsilon_{180}$ = 455 | $\epsilon_{180}$ = 1267 |

The finite element analysis data for the four different load scenarios was then analyzed to develop an equation which defines the load on the bearing at a rolling element position to the strain measured on the bearing at that rolling element position for the inboard bearing 36 and the outboard bearing 38. The equations are summarized in Table 9 and Table 10 below.

TABLE 9

Inboard Bearing

| Position | Equation (load) |
|---|---|
| 0° | $24.91 + 39{,}407{,}741.62\,\epsilon_0 - 535{,}064{,}932.19\epsilon_0^2$ |
| 30° | $-293.92 + 40{,}920{,}447.21\epsilon_{30} - 1{,}012{,}118{,}463.42\epsilon_{30}^2$ |
| 60° | $-1{,}185.36 + 48{,}544{,}381.07\epsilon_{60} - 4{,}052{,}440{,}606.9\epsilon_{60}^2$ |
| 90° | $[-4{,}522.45 + 40{,}573{,}226.33\epsilon_{90} + (0.44/\epsilon_{90}) * [(\epsilon_{90}/0.001717) + ((0.001717 - \epsilon_{90})/0.001717) * (0.95 + 1.33(\epsilon_{90}/\epsilon_{60}) - 2.31(\epsilon_{90}/\epsilon_{60})^2)]$ |
| 120° | $152.56 - 77{,}979{,}046.95\epsilon_{120} + 120{,}300{,}127{,}079.045\epsilon_{120}^2$ |
| 150° | $33.81 + 12{,}194{,}209.87\epsilon_{150} + 562{,}506{,}334{,}955.323\epsilon_{150}^2$ |
| 180° | $-4.95 - 433{,}118.97\epsilon_{180} + 18{,}147{,}462{,}791.7479\epsilon_{180}^2$ |

TABLE 10

Outboard Bearing

| Position | Equation (load) |
|---|---|
| 0° | $(1{,}218.17 + 30{,}458{,}490.76\epsilon_0 + 12{,}765{,}869{,}779.67\epsilon_0^2)(0.91 + 536.54\epsilon_0 - 683{,}964.46\epsilon_0^2)$ |
| 30° | $995.76 + 30204809.32\epsilon_{30} + 17606550027.004\epsilon_{30}^2$ |
| 60° | $(-236.37 + 34{,}407{,}365.66\epsilon_{60} + 27815553814.83\epsilon_{60}^2)(1.35 - 2{,}756.59\epsilon_{60} + 4{,}942{,}878.61\epsilon_{60}^2)$ |
| 90° | $(-30{,}402.81 + 456{,}780{,}502.06\epsilon_{90} - 1371240810470.59\epsilon_{90}^2)(6.09 - 43{,}591.45\epsilon_{90} + 80186940.08\epsilon_{90}^2)$ |
| 120° | $72.38 - 186{,}544{,}637.27\epsilon_{120} + 384{,}078{,}294{,}712.96\epsilon_{120}^2$ |
| 150° | $54.47 + 4222828.10\epsilon_{150} + 30262956013.54\epsilon_{150}^2$ |
| 180° | $17.52 - 2062912.95\epsilon_{180} + 31086730839.56\epsilon_{180}^2$ |

As the equations are being developed, the strain gage readings are plugged back into the equations to see how close the equation comes to approximating the load on the bearing. The calculated loads are compared to the actual loads, and an error for each strain gage position is calculated. If the error is too large, then the errors can be analyzed using regression analysis techniques to develop an equation defining the error as a function of the strain at any rolling element position, and that equation is added to the original equation resulting in a more accurate calculation. This can be repeated many times, each time plugging the actual strain values into the new equation and comparing the calculated loads to the actual loads. When the amount of error is low enough to be satisfactory, then the equation is done. Some of the equations in Tables 9 and 10 above were corrected in this way, thereby making those equations more complex than some of the others. A summary of the calculated load data and the actual load data is included in Tables 11, 12, 13 & 14 below.

TABLE 11

Wheel Load: 121,000 lbs. Side Load: 0 lbs.

| | Inboard Bearing | | Outboard Bearing | |
|---|---|---|---|---|
| Position | Actual Load (lbs.) | Calc. Load (lbs.) | Actual Load (lbs.) | Calc. Load (lbs.) |
| 0° | 7217 | 7219 | 6446 | 6455 |
| 30° | 6587 | 6551 | 6096 | 6136 |
| 60° | 4985 | 5028 | 5084 | 5084 |
| 90° | 3058 | 3536 | 3536 | 3536 |
| 120° | 1412 | 1784 | 1784 | 1205 |
| 150° | 371 | 337 | 337 | 120 |
| 180° | 23 | 0 | 0 | 9 |

TABLE 12

Wheel Load: 398,000 lbs. Side Load: 39,800 lbs.

| | Inboard Bearing | | Outboard Bearing | |
|---|---|---|---|---|
| Position | Actual Load (lbs.) | Calc. Load (lbs.) | Actual Load (lbs.) | Calc. Load (lbs.) |
| 0° | 29234 | 29241 | 11987 | 11966 |
| 30° | 26910 | 26748 | 11437 | 11398 |
| 60° | 19571 | 17856 | 9724 | 9724 |
| 90° | 5358 | 5305 | 6666 | 6666 |
| 120° | 0 | −234 | 1657 | 1976 |
| 150° | 0 | −32 | 0 | 146 |
| 180° | 0 | 5 | 0 | −14 |

TABLE 13

Wheel Load: 448,000 lbs. Side Load: 0 lbs.

| | Inboard Bearing | | Outboard Bearing | |
|---|---|---|---|---|
| Position | Actual Load (lbs.) | Calc. Load (lbs.) | Actual Load (lbs.) | Calc. Load (lbs.) |
| 0° | 24299 | 24291 | 21534 | 21541 |
| 30° | 22385 | 22583 | 20299 | 20309 |
| 60° | 16544 | 18217 | 16574 | 16574 |
| 90° | 5673 | 5673 | 8997 | 8994 |
| 120° | 0 | 466 | 0 | 259 |
| 150° | 0 | 109 | 0 | 72 |
| 180° | 0 | −7 | 0 | 5 |

TABLE 14

Wheel Load: 676,000 lbs. Side Load: 406,000 lbs.

| | Inboard Bearing | | Outboard Bearing | |
|---|---|---|---|---|
| Position | Actual Load (lbs.) | Calc. Load (lbs.) | Actual Load (lbs.) | Calc. Load (lbs.) |
| 0° | 130577 | 130577 | 0 | −34 |
| 30° | 121525 | 121526 | 0 | −11 |
| 60° | 97306 | 97305 | 0 | 146 |
| 90° | 65380 | 65396 | 0 | 6511 |
| 120° | 34794 | 34794 | 22385 | 22385 |
| 150° | 13107 | 13108 | 43760 | 43760 |
| 180° | 3555 | 3555 | 47307 | 47307 |

Next, the loads at the rolling element positions which did not have a strain gage 20 mounted adjacent to them were extrapolated linearly. The loads were then resolved into radial and axial components by using the contact angle of the tapered bearing. Then, finally, the radial and axial loads were summed for each of the four load conditions to determine the total load on the bearing under each loading condition. Due to the symmetry of the bearing, the load at 0° and 180° are counted once, and the loads at 10° through 170° are counted twice to accommodate for the corresponding rolling element on the opposite side of the bearing. The final results are summarized in Tables 15, 16, 17 & 18 below, wherein all entries are in pounds.

TABLE 15

Wheel Load: 121,000 lbs. Side Load: 0 lbs.

| | Inboard Bearing | | | Outboard Bearing | | |
|---|---|---|---|---|---|---|
| Position | Rolling element load (pounds) | Axial Load (pounds) | Radial Load (pounds) | Rolling element load (pounds) | Axial Load (pounds) | Radial Load (pounds) |
| 0° | 7219 | 1,562 | 7,048 | 6455 | 1,397 | 6,302 |
| 10° | 7145 | 1,547 | 6,870 | 6420 | 1,390 | 6,172 |
| 20° | 6918 | 1,497 | 6,347 | 6311 | 1,366 | 5,790 |
| 30° | 6551 | 1,418 | 5,539 | 6136 | 1,328 | 5,188 |
| 40° | 6155 | 1,332 | 4,603 | 5863 | 1,269 | 4,385 |
| 50° | 5637 | 1,220 | 3,538 | 5505 | 1,191 | 3,455 |
| 60° | 5028 | 1,088 | 2,454 | 5084 | 1,100 | 2,482 |
| 70° | 4400 | 952 | 1,469 | 4573 | 990 | 1,527 |
| 80° | 3791 | 821 | 643 | 4078 | 883 | 691 |
| 90° | 3126 | 677 | 0 | 3536 | 765 | 0 |
| 100° | 2464 | 533 | −418 | 2743 | 594 | −465 |
| 110° | 1822 | 394 | −608 | 1974 | 427 | −659 |
| 120° | 1180 | 255 | −576 | 1205 | 261 | −588 |
| 130° | 878 | 190 | −551 | 836 | 181 | −525 |
| 140° | 586 | 127 | −438 | 478 | 103 | −357 |
| 150° | 293 | 63 | −248 | 120 | 26 | −101 |
| 160° | 202 | 44 | −185 | 82 | 18 | −75 |
| 170° | 114 | 25 | −110 | 46 | 10 | −44 |
| 180° | 26 | 6 | −25 | 9 | 2 | −9 |

TABLE 16

Wheel Load: 398,000 lbs. Side Load: 39,800 lbs.

| | Inboard Bearing | | | Outboard Bearing | | |
|---|---|---|---|---|---|---|
| Position | Rolling element load (pounds) | Axial Load (pounds) | Radial Load (pounds) | Rolling element load (pounds) | Axial Load (pounds) | Radial Load (pounds) |
| 0° | 29241 | 6,329 | 28,548 | 11966 | 2,590 | 11,682 |
| 10° | 28967 | 6,270 | 27,851 | 11903 | 2,576 | 11,445 |
| 20° | 28119 | 6,086 | 25,797 | 11710 | 2,535 | 10,743 |
| 30° | 26748 | 5,789 | 22,615 | 11398 | 2,467 | 9,637 |
| 40° | 24436 | 5,289 | 18,275 | 10963 | 2,373 | 8,199 |
| 50° | 21412 | 4,634 | 13,437 | 10394 | 2,250 | 6,522 |
| 60° | 17856 | 3,865 | 8,716 | 9724 | 2,105 | 4,747 |
| 70° | 13714 | 2,968 | 4,579 | 8715 | 1,886 | 2,910 |
| 80° | 9698 | 2,099 | 1,644 | 7736 | 1,674 | 1,312 |
| 90° | 5305 | 1,148 | 0 | 6666 | 1,443 | 0 |
| 100° | 3421 | 741 | −580 | 5071 | 1,098 | −860 |
| 110° | 1594 | 345 | −532 | 3524 | 763 | −1,177 |
| 120° | −234 | −51 | 114 | 1976 | 428 | −965 |
| 130° | −165 | −36 | 104 | 1354 | 293 | −850 |
| 140° | −98 | −21 | 74 | 750 | 162 | −561 |
| 150° | −32 | −7 | 27 | 146 | 32 | −123 |
| 160° | −19 | −4 | 18 | 91 | 20 | −84 |
| 170° | −7 | −2 | 7 | 39 | 8 | −37 |
| 180° | 5 | 1 | −5 | −14 | −3 | 13 |

TABLE 17

Wheel Load: 448,000 lbs. Side Load: 0 lbs.

| | Inboard Bearing | | | Outboard Bearing | | |
|---|---|---|---|---|---|---|
| Position | Rolling element load (pounds) | Axial Load (pounds) | Radial Load (pounds) | Rolling element load (pounds) | Axial Load (pounds) | Radial Load (pounds) |
| 0° | 24291 | 5,257 | 23,715 | 21541 | 4,662 | 21,030 |
| 10° | 24103 | 5,217 | 23,174 | 21405 | 4,633 | 20,580 |
| 20° | 23522 | 5,091 | 21,580 | 20986 | 4,542 | 19,253 |
| 30° | 22583 | 4,888 | 19,094 | 20309 | 4,396 | 17,171 |
| 40° | 21448 | 4,642 | 16,040 | 19338 | 4,185 | 14,462 |
| 50° | 19964 | 4,321 | 12,528 | 18068 | 3,911 | 11,338 |
| 60° | 18217 | 3,943 | 8,893 | 16574 | 3,587 | 8,090 |
| 70° | 14078 | 3,047 | 4,701 | 14072 | 3,046 | 4,699 |
| 80° | 10063 | 2,178 | 1,706 | 11647 | 2,521 | 1,975 |
| 90° | 5673 | 1,228 | 0 | 8994 | 1,947 | 0 |
| 100° | 3903 | 845 | −662 | 6025 | 1,304 | −1,021 |
| 110° | 2184 | 473 | −729 | 3142 | 680 | −1,049 |
| 120° | 466 | 101 | −228 | 259 | 56 | −127 |
| 130° | 345 | 75 | −216 | 196 | 42 | −123 |
| 140° | 227 | 49 | −170 | 134 | 29 | −100 |
| 150° | 109 | 24 | −92 | 72 | 16 | −61 |
| 160° | 69 | 15 | −64 | 49 | 11 | −45 |
| 170° | 31 | 7 | −30 | 27 | 6 | −26 |
| 180° | −7 | −2 | 7 | 5 | 1 | −4 |

TABLE 18

Wheel Load: 676,000 lbs. Side Load: 406,000 lbs.

| | Inboard Bearing | | | Outboard Bearing | | |
|---|---|---|---|---|---|---|
| Position | Rolling element load (pounds) | Axial Load (pounds) | Radial Load (pounds) | Rolling element load (pounds) | Axial Load (pounds) | Radial Load (pounds) |
| 0° | 130577 | 28,262 | 127,482 | −34 | −7 | −33 |
| 10° | 129581 | 28,047 | 124,588 | −26 | −6 | −25 |
| 20° | 126504 | 27,380 | 116,057 | −19 | −4 | −17 |
| 30° | 121526 | 26,303 | 102,750 | −11 | −2 | −9 |
| 40° | 115229 | 24,940 | 86,178 | 41 | 9 | 31 |
| 50° | 106994 | 23,158 | 67,144 | 93 | 20 | 58 |
| 60° | 97305 | 21,061 | 47,499 | 146 | 32 | 71 |
| 70° | 86775 | 18,782 | 28,975 | 2246 | 486 | 750 |
| 80° | 76564 | 16,571 | 12,980 | 4347 | 941 | 737 |

TABLE 18-continued

Wheel Load: 676,000 lbs. Side Load: 406,000 lbs.

| | Inboard Bearing | | | Outboard Bearing | | |
|---|---|---|---|---|---|---|
| Position | Rolling element load (pounds) | Axial Load (pounds) | Radial Load (pounds) | Rolling element load (pounds) | Axial Load (pounds) | Radial Load (pounds) |
| 90° | 65396 | 14,154 | 0 | 6511 | 1,409 | 0 |
| 100° | 54991 | 11,902 | −9,323 | 12067 | 2,612 | −2,046 |
| 110° | 44893 | 9,717 | −14,990 | 17146 | 3,711 | −5,725 |
| 120° | 34794 | 7,531 | −16,985 | 22385 | 4,845 | −10,927 |
| 130° | 27421 | 5,935 | −17,208 | 30935 | 6,696 | −19,413 |
| 140° | 20264 | 4,386 | −15,155 | 38202 | 8,269 | −28,571 |
| 150° | 13108 | 2,837 | −11,083 | 43760 | 9,471 | −36,999 |
| 160° | 9860 | 2,134 | −9,046 | 45711 | 9,894 | −41,936 |
| 170° | 6707 | 1,452 | −6,449 | 46917 | 10,155 | −45,109 |
| 180° | 3555 | 769 | −3,471 | 47307 | 10,239 | −46,186 |

As discussed above, the radial and axial loads for the 0° and 180° positions are counted once, and all the positions from 10° through 170° are counted twice to sum the radial and axial loads for the entire bearing. The summaries of the total loads on the bearing as derived by using the method of the present invention are listed in Table 19 below.

TABLE 19

Total Bearing Loads

| Axle Load Conditions | Inboard Bearing | | Outboard Bearing | |
|---|---|---|---|---|
| (pounds) | Axial (lbs.) | Radial (lbs.) | Axial (lbs.) | Radial (lbs.) |
| 121K/0 | 25,935 | 63,681 | 25,203 | 60,042 |
| 398K/39.8K | 84,556 | 272,834 | 46,809 | 113,412 |
| 449K/0 | 77,540 | 234,773 | 74,485 | 211,062 |
| 676K/406K | 521,609 | 1,095,880 | 127,304 | −424,481 |

The next and final step in the process is to use the total loads experienced on the bearing assembly 10 to determine the selection criteria to select an appropriate bearing to be used in an application with the same or similar axle 30 and load conditions.

The foregoing discussion discloses and describes preferred embodiments of the invention. One skilled in the art will readily recognize from such discussion, and from the accompanying drawings and claims, that changes and modifications can be made to the invention without departing from the true spirit and fair scope of the invention as defined in the following claims. The invention has been described in an illustrative manner, and it is to be understood that the terminology which has been used is intended to be in the nature of words of description rather than of limitation.

What is claimed is:

1. A rolling element bearing assembly comprising:
an inner race having a central axis mounted to an axle shaft;
an outer race adapted to support a bearing carrier and mounted to said inner race;
an annular channel formed within one of said axle shaft and said bearing carrier and extending around said bearing assembly to provide an unsupported cylindrical surface of said inner race or said outer race extending around said bearing assembly;
a plurality of rolling element elements disposed between and interconnecting said outer race and said inner race to support said outer race on said inner race and to allow said outer race to rotate with respect to said inner race about said central axis; and
a plurality of strain gages mounted to said unsupported cylindrical surface of said inner race or said outer race of said bearing assembly, said strain gages being oriented to measure axial strain results from bending deflection of said inner race or said outer races in response to an applied load.

2. The rolling element bearing assembly of claim 1 wherein said annular channel is formed within said axle and extends circumferentially about said axle, and said inner race includes an inner diameter straddling said channel, said unsupported surface being a portion of said inner diameter of said inner race immediately over said channel, said plurality of strain gages being mounted to said unsupported surface of said inner race.

3. The rolling element bearing assembly of claim 2 wherein said inner race is mounted to said axle and is rotationally stationary with respect to said axle and to the loads placed upon said axle, said strain gages being mounted to said inner race at the point of direct radial loading.

4. The rolling element bearing assembly of claim 1 wherein said annular channel is formed within said bearing carrier and extends circumferentially about said bearing carrier, and said outer race includes an outer diameter straddling said channel, said unsupported surface being a portion of said outer diameter of said outer race aligned with said channel, said plurality of strain gages being mounted to said unsupported surface of said outer race.

5. The rolling element bearing assembly of claim 4 wherein said inner race is mounted to said axle and is rotationally stationary with respect to said axle, and the loads placed upon said bearing rotate about said axle, said strain gages being mounted to said outer race at the point of direct radial loading.

6. The rolling element bearing assembly of claim 1 wherein said axle is a motor vehicle axle adapted to support a wheel of the vehicle.

7. The rolling element bearing assembly of claim 1 wherein said bearing assembly is connected to a device to receive the data produced by the strain gages, instantaneously perform calculations and conversions, and to provide real time output of the radial and axial loads on the bearing.

8. The rolling element bearing assembly of claim 1 wherein one of said plurality of strain gages is mounted at the point of direct radial loading, and the remaining of said strain gages are spaced circumferentially from said one of said strain gages.

9. The rolling element bearing assembly of claim 8 including two strain gages, a first of said strain gages being located at the point of direct radial loading, and the other of said strain gages being circumferentially spaced from the first of said strain gages.

10. The rolling element bearing assembly of claim 8 including a plurality of strain gages spaced equally about said unsupported surface and aligned with rolling element positions within the bearing.

11. The rolling element bearing assembly of claim 8 wherein said plurality of strain gages includes a strain gage for each rolling element position within the bearing, each of said plurality of strain gages being mounted to said unsupported surface of said bearing assembly in line with one of said rolling elements.

12. A method for determining real time load values experienced by a bearing comprising:
   providing a bearing including an inner race mounted to an axle, an outer race supporting a bearing carrier, and a plurality of rolling elements disposed therebetween, one of the inner race, the outer race, the axle or the bearing carrier including an annular channel extending circumferentially about the bearing which provides an unsupported cylindrical surface to allow bending deflection in the axial direction of the bearing at that point;
   mounting a plurality of strain gages to the unsupported surface of either the inner race or the outer race of the bearing at bearing rolling element positions and axially aligned with the bearing;
   collecting the strain data from each of the plurality of strain gages under each of a plurality of known load ratio and load conditions;
   calculating a strain gage ratio for each combination of load ratios and loads;
   averaging the strain gage ratios for each of the plurality of load ratios;
   calculating a first equation by completing regression analysis to derive a second order equation that defines the ratio of the loads as a function of the ratio of the strain gages;
   calculating a second equation by completing a regression analysis to derive an equation defining the sum of the radial and axial loads as a function of the strain on the heaviest loaded strain gage, the equation having a unique slope for each load ratio;
   calculating a third equation by completing a regression analysis to derive a equation that defines the slope of the second equation as a function of the load ratios;
   calculating a fourth equation by combining the second equation and the third equation to develop an equation defining the sum of the radial and axial loads as a function of the strain and the ratio of the radial load to the axial load;
   mounting the bearing to a machine and using the machine under loaded conditions;
   collecting the strain gage data produced as the machine experiences varying load conditions;
   inputting the strain gage values taken under unknown load conditions into the first equation to solve for the ratio of the actual radial loads to the actual axial loads;
   inputting the ratio of actual radial to actual axial loads into the fourth equation to solve for the sum of actual radial and actual axial loads;
   using the sum of actual radial and actual axial loads and the ratio of the actual radial and actual axial loads to calculate the actual radial load and the actual axial load being placed on the bearing.

13. The method of claim 12 wherein collecting data of the strains measured at each strain gage under a plurality of known load conditions includes placing the bearing with the strain gages mounted thereto onto a test fixture and collecting data from the strain gages while cycling the bearing through the plurality of known load conditions.

14. The method of claim 12 wherein collecting data of the strains measured at each strain gage under a plurality of know load conditions includes creating a finite element model of the bearing and using finite element analysis to calculate the stresses at the strain gage positions under the plurality of known load conditions.

15. The method of claim 12 further including providing a device to receive the data produced by the strain gages, instantaneously perform the calculations and conversions, and to provide real time output of the radial and axial loads on the bearing, attaching the strain gages to the device and using the device to collect the data produced and to convert the strains measured into real time radial and axial loads.

16. A method for determining real time load values experienced by a bearing comprising:
   providing a bearing including an inner race mounted to an axle, an outer race mounted to a bearing carrier, and a plurality of rolling elements disposed therebetween, one of the inner race, the outer race, the axles or the bearing carrier including an annular channel extending circumferentially around the bearing which provides an unsupported surface to allow bending deflection in the axial direction of the bearing at that point;
   mounting a plurality of strain gages to the unsupported surface of either the inner race or the outer race of the bearing assembly at bearing rolling element positions and axially aligned with the bearing
   collecting data of the strains measured at each strain gage under a plurality of known load conditions;
   correlating the strains measured at each strain gage position to the load at that position for each of the plurality of load conditions and using regression analysis of the strain data for each of the different load conditions to develop a first equation for each strain gage position defining the load at each strain gage position as a function of the strain measured at that position;
   mounting the bearing to a machine and using the machine under loaded conditions;
   collecting the strain gage data produced as the machine experiences varying load conditions;
   using the equations for each strain gage position to convert the strain measured at each strain gage position into a load at that position;
   extrapolating between strain gage positions to calculate a load for rolling element positions that did not have a strain gage mounted thereon;
   summing the loads experienced by the bearing at each rolling element position to determine the total load being experienced by the bearing.

17. The method of claim 16 wherein collecting data of the strains measured at each strain gage under a plurality of known load conditions includes placing the bearing with the strain gages mounted thereto onto a test fixture and collecting data from the strain gages while cycling the bearing through the plurality of known load conditions.

18. The method of claim 16 wherein collecting data of the strains measured at each strain gage under a plurality of know load conditions includes creating a finite element model of the bearing and using finite element analysis to calculate the stresses at the strain gage positions under the plurality of known load conditions.

19. The method of claim 16 wherein correlating the strains measured at each strain gage position to the load at that position for each of the plurality of load conditions to develop a first equation at each strain gage position defining the load at each strain gage position as a function of the strain measured at that position includes calculating the error between the actual strains measured and the value produced by the first equation and performing a regression of the error to develop a first error equation defining the error as a function of the strain measured at each strain gage position and combining the first equation and the first error equation to form a second equation more accurately defining the load at each strain gage position as a function of the strain measured at that position.

20. The method of claim 16 wherein collecting the strain gage data produced as the machine experiences varying load conditions, using the equations for each strain gage position to convert the strain measured at each strain gage position into a load at that position, extrapolating between strain gage positions to calculate a load for rolling element positions that did not have a strain gage mounted thereon, and summing the loads experienced by the bearing at each rolling element position to determine the total load being experienced by the bearing includes providing a device to receive the data produced by the strain gages, to instantaneously perform the calculations and conversions, and to provide real time output of the radial and axial loads on the bearing, attaching the strain gages to the device and using the device to collect the data produced and to convert the strains measured into real time radial and axial loads.

21. The method of claim 16 wherein summing the loads experienced by the bearing at each rolling element position to determine the total load being experienced by the bearing includes resolving the loads at each bearing rolling element position into axial and radial components, and summing the axial components and radial components to calculate the total radial force on the bearing and the total axial force on the bearing.

* * * * *

UNITED STATES PATENT AND TRADEMARK OFFICE
CERTIFICATE OF CORRECTION

PATENT NO.    : 6,687,623 B2
DATED         : February 3, 2004
INVENTOR(S)   : Ted E. Bailey et al.

It is certified that error appears in the above-identified patent and that said Letters Patent is hereby corrected as shown below:

Column 18,
Line 26, after "said outer" delete "races" and substitute -- race -- in its place.

Signed and Sealed this

Seventeenth Day of August, 2004

JON W. DUDAS
*Acting Director of the United States Patent and Trademark Office*